United States Patent [19]
Britt et al.

[11] 3,754,708
[45] Aug. 28, 1973

[54] GAS TURBINE ENGINE THRUST REVERSERS

[75] Inventors: Jack Britt, Ambergate; Leonard John Rodgers, Spondon, both of England

[73] Assignee: The Secretary of State for Defence, in Her Britannic Majesty's Government of the United Kingdom of Great Britain and Northern Ireland, Whitehall, London, England

[22] Filed: Oct. 18, 1971

[21] Appl. No.: 190,354

[30] Foreign Application Priority Data
Oct. 20, 1970 Great Britain .................... 48662/70

[52] U.S. Cl. .......................................... 239/265.29
[51] Int. Cl. .......................................... B64c 15/04
[58] Field of Search ................. 239/265.27, 265.29, 239/265.37, 265.31

[56] References Cited
UNITED STATES PATENTS

| 3,511,055 | 5/1970 | Timms .......................... 239/265.29 |
| 3,608,314 | 9/1971 | Colley .......................... 239/265.29 |
| 3,500,646 | 3/1970 | Hom et al. ..................... 239/265.29 |
| 3,568,931 | 3/1971 | Mortlock et al. ............... 239/265.29 |
| 3,603,090 | 9/1971 | Billinger et al. ............... 239/265.29 |

*Primary Examiner*—Lloyd L. King
*Attorney*—Cushman, Darby & Cushman

[57] ABSTRACT

Aircraft gas turbine engine duct blocker doors are mounted so as to move across the duct in a manner which causes fluid pressures to combine with door mounting structure reaction loads so as to produce a resultant force on the doors which, up to a given point in aircraft flight conditions, the resultant force tries to stop the doors from moving across the duct and, beyond said point, helps the doors to move across the duct, thereby providing a fail/safe operation of the doors during given aircraft flight conditions.

7 Claims, 8 Drawing Figures

GAS TURBINE ENGINE THRUST REVERSERS

This invention concerns gas turbine engine thrust reversers.

It has, in the past, proved difficult to provide gas turbine engines with thrust reverser equipment which will, in the event of failure of the reverser actuating means, move to a position which will least impair the thrust requirements from the engine at the time of failure. For example if the engine is mounted on an aircraft for propulsion thereof and the aircraft is making a landing approach and the thrust reverser means is being utilized to control the total forward thrust of the engine, as is described in the copending U. S. application Ser. No. 123,753 filed Mar. 12, 1971., should the reverser actuating means fail, it is imperative that the blocker doors which form part of the reverser equipment, return to their non-operative positive wherein they form a continuation of the fluid flow duct wall, thus so as to be able to obtain full thrust from the engine to keep the aircraft flying. If the aircraft is about to touch down or has touched down and full reverse thrust is required but the actuating mechanism fails, then the blocker flaps must be able at this point in time, to swing fully across said duct so as to block the fluid flow and so brake the aircraft.

It is therefore an object of this invention to provide thrust reverser equipment which incorporates fail/safe features for each of the conditions stated hereinbefore.

Accordingly the present invention comprises a gas turbine engine having a fluid flow duct defined by at least one wall, said wall including within its length a plurality of peripherally spaced fluid flow blocker doors which when non-operative block respective apertures in said wall and which are articulately linked by their mid portions to fixed structure upstream of said apertures and movably mounted at their downstream ends in mounting means, mounted on fixed structure downstream of said apertures, and blocker door actuating means, the arrangement being such that actuation of said actuation means causes said doors to move across the fluid flow at an angle or series of angles to the direction of fluid flow such that the combination of fluid pressure on the outer surfaces thereof and mounting means reaction forces on the door mounting therein, provides a resultant force which tends to return the doors to their in-operative position, until such time as engine resultant thrust is zero whereupon the direction of the resultant force reverses.

Preferably the mounting means comprises a cam track.

Alternatively the mounting means could comprise links.

Preferably initial direction of movement of the blocker doors towards the fluid flow blocking position is substantially radially inwards towards the duct axis, the doors being maintained substantially parallel therewith, thus permitting fluid at duct pressure to flow both sides of each of said blocker doors.

Preferably the actuating means comprises a plurality of chains spaced in pairs between adjacent blocker doors and supported on sprocket wheels.

Preferably each chain is connected to the downstream end of each respective blocker door by an extension through the cam tracks of one of the pins which link the tension plates of the chain.

Preferably several consecutive pins of each chain are also extended, but in the opposite direction to said one pin and located in a further cam track similar in profile to the first cam track such that a portion of the chain is supported on both sides and caused to follow a preselected curved path defined by the cam tracks when moving between at least two adjacent sprocket wheels.

Preferably the chains are connected for driving in pairs.

Preferably the connection is obtained by a yoke, each end of the yoke being attached to a pin of a respective chain, the yoke being adapted for traversing axially of the duct.

Preferably the adaptation comprises attaching the yoke means to the nut of a ball screw and nut assembly such that rotation of the screw traverses the nut and yoke means together axially of the duct, thus driving the pair of chains.

Alternatively each chain may be gear driven.

The invention will now be described by way of example only and with reference to the accompanying drawings in which.

Figure 1:
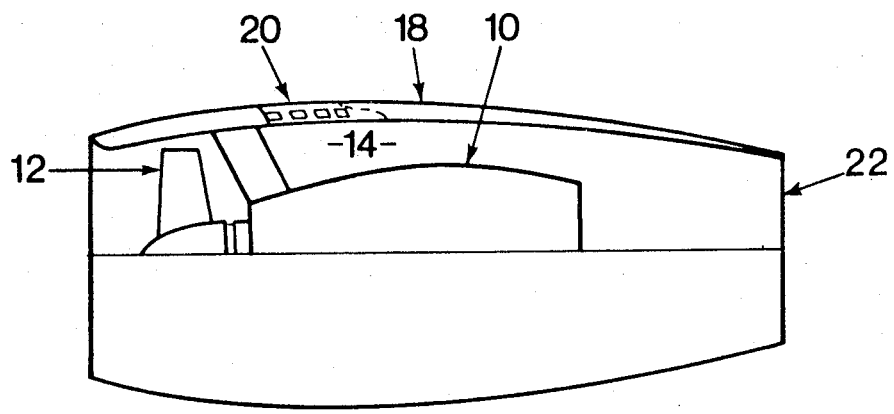
FIG. 1 is a diagrammatic view of a gas turbine engine.

In FIG. 1 a gas turbine engine 10 includes a ducted fan stage 12, the duct 14 being defined by the engine casing 16 and fan cowl 18.

Fan cowl 18 contains thrust deflecting equipment 20 whereby during operation of the engine air flowing through duct 14 may be partially or totally deflected through an aperture in cowl 18 instead of being ejected from the nozzle 22.

Figure 3:
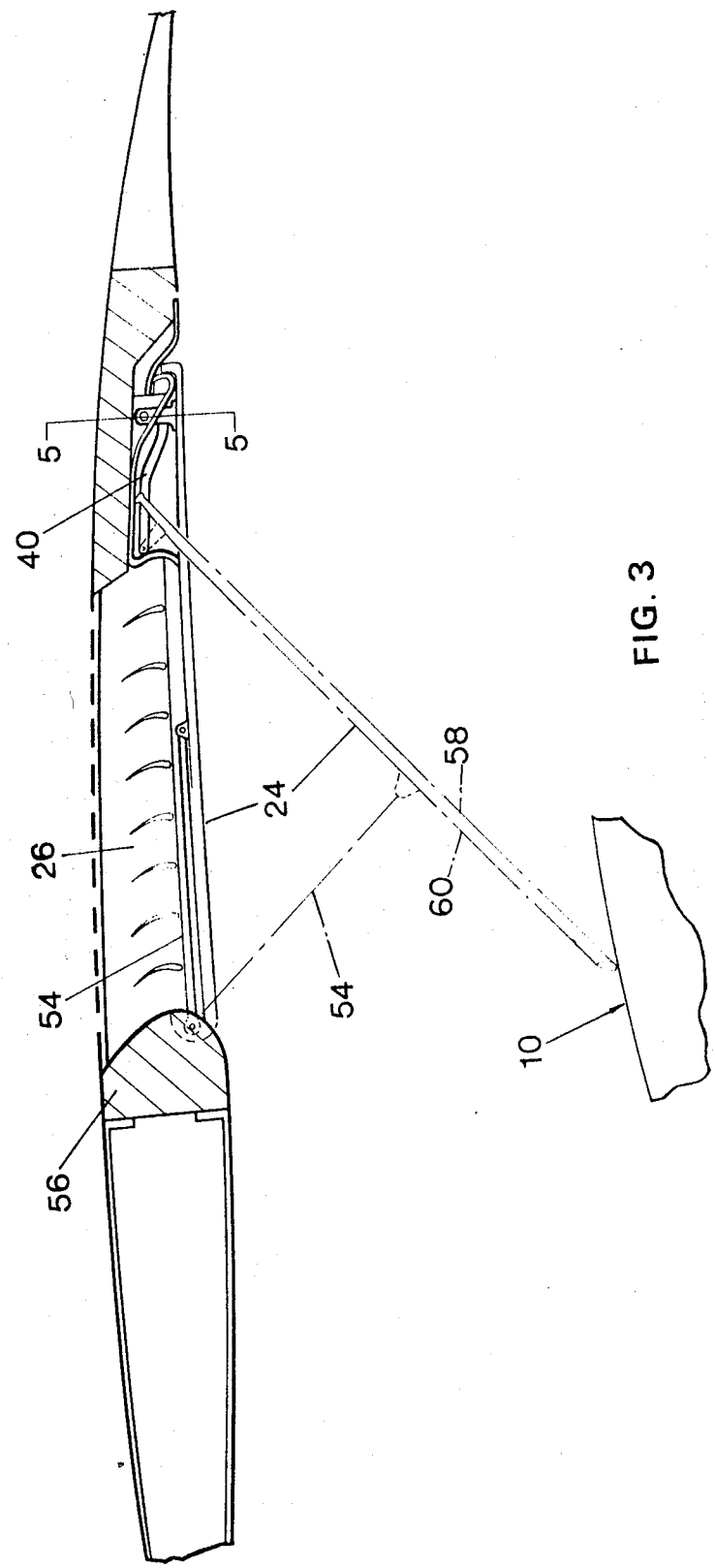
FIG. 3 is an enlarge axial section on line 2—2 of FIG. 2.
Figure 4:
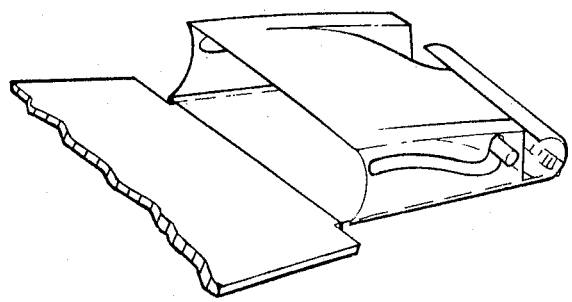
FIG. 4 is a pictorial part view of a fan cowl structure.

The thrust deflecting apparatus comprises a plurality of blocker doors 24 spaced peripherally of the outer wall of duct 14 so that when not operative, the doors form smooth continuations of the outer wall of the duct as can be seen in FIG. 3.

Figure 5:
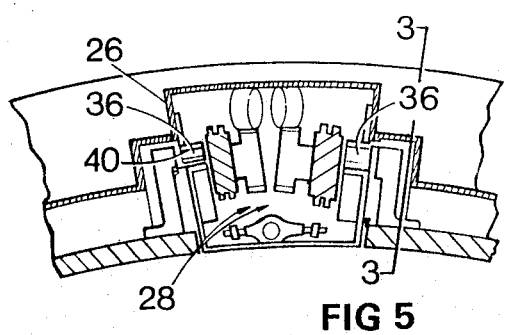
FIG. 5 is a part sectional view on line 5—5 of FIG. 3.
Figure 6:
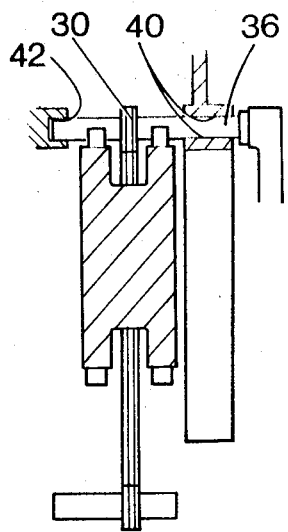
FIG. 6 is an enlarged part view of an idler sprocket wheel.
Figure 7:
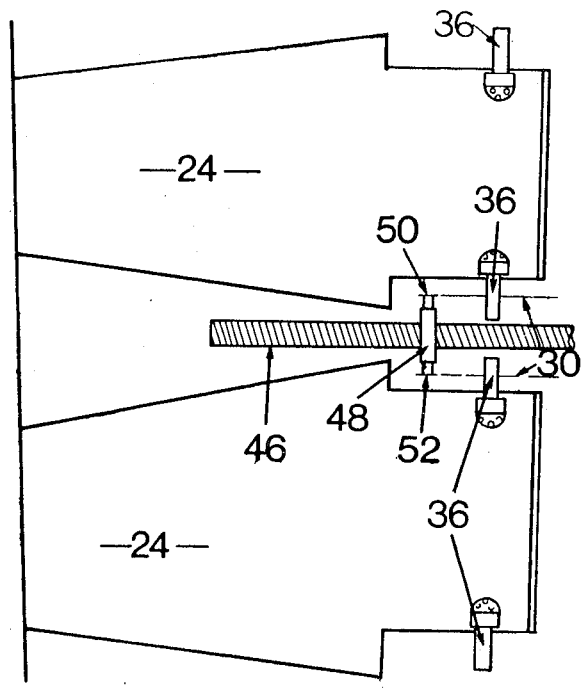
FIG. 7 is a developed part view of a pair of adjacent blocker doors.

Adjacent doors are spearated by a rigid strut 26 which is hollow and contains blocker door actuating mechanisms 28 (FIG. 5). This mechanism extends downstream into fixed structure which forms part of the downstream portion of cowl 18 and said mechanism preferably comprises a pair of sprocket chains 30, seen best in FIGS. 6, 7 and 8, each supported by four idler double sprocket wheels 32, 33, 34 and 35 mounted for rotation about fixed axes in the fixed structure. Double sprocket wheels having the chain therebetween are used in order to centralise the tensile loads felt by the chain during operation of the mechanism. The blocker doors are connected at their downstream ends, by a lug mounted pin or roller 36, which extends through a fixed cam track 40 and forms one pin of a respective chain. This is best seen in FIG. 6. The particular pin 36 is further extended so that its end remote from the blocker door lug, at least during some part of the operation of the mechanism, is located in a further cam track 42 similar in shape to cam track 40. The cam tracks are aligned with each other. One set of four sprocket wheels 32, 33, 34 and 35 lies in a plane centrally of the two cam tracks. Several of the pins 44 which connect the links of each sprocket chain are also extended so that they at some part of the operation, locate in cam track 42, the reason being that the upper parts of the cam tracks are curved and the chain must be forced to follow the curve rather than a straight line between wheels 34 and 35. Any side loads experienced by pins 44 whilst following the curve thus, are absorbed by the cam tracks and the structure to which the cam tracks are fixed.

In the particular example, each pair of chains is driven by a ball screw and nut mechanism 46 which lies between the chains, a yoke 48 being attached to the nut and each end 50, 52 of the yoke in turn being adapted to act on a link pin in a respective chain.

Each blocker door 24 is further connected to fixed structure by a link 54 of which that end remote from the door is pivotally connected to a solid ring 56 at the upstream end of the aperture in cowl 18.

OPERATION

The gas turbine engine described herein is designed for mounting on an aircraft and during normal cruise flight of the aircraft, blocker doors 24 will lie in known manner along the outer wall of duct 14. When the aircraft starts its landing run, the pilot will control the engine in the manner described in the co-pending application Ser. No. 123,753. Briefly, that is, although descending, he will set the engine controls at take off thrust, but will then operate his thrust reverser controls so as to open and close, in a controlled manner, the blocker doors 24 and other external aperture closure means (not shown) so as to spoil the take off thrust, the overall result being that the aircraft will reduce forward speed and so continue to descend. During the descent, the blocker doors must never move fully across the duct 14 for if this happened, all forward thrust would be spoiled and the aircraft forward speed would dramatically reduce. This could happen if the actuating mechanism of the blocker doors fails, the result being that the doors would be moved by duct air pressure to a duct blocking position. However, the mounting of doors 24 in cam track 40 and by link 54 ensures by virture of the shape of cam track 40 that each door is moved in such a manner that until the door reaches a position where the resultant thrust produced by the engine is zero, (that is, reverse thrust equals forward thrust) the resultant of the fluid loads on the door produces a force on the actuating mechanism in a direction such as to return the door to its non-operative, i.e. full forward thrust position.

As described in the co-pending application Ser. No. 123,753 the full reverse thrust will not be deliberately selected until touchdown or immediately before touchdown whereupon the blocker doors will move past the position of engine zero resultant thrust towards full reverse thrust and the direction of the resultant force exerted on the actuator mechanisms will reverse thus holding the doors in the full duct blocking position, so if actuator failure occurs at this stage, aircraft braking will still be achieved as is desirable.

Figure 2:
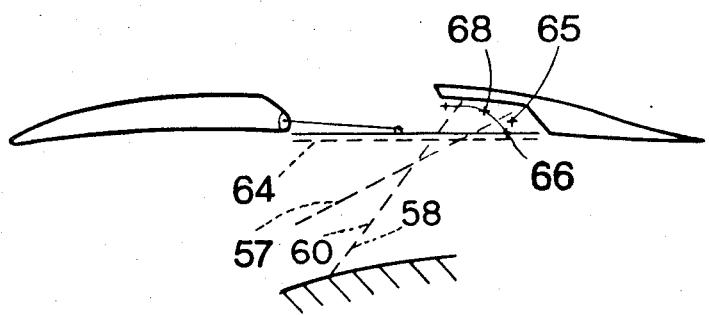
FIG. 2 is a general axis diagrammatic section through the fan cowl of the gas turbine engine of FIG. 1.

The actual movements of the blocker doors are attained by the pilot rotating the ball screws 46 by flexible drives 62 so that each yoke 48 moves axially of the duct in the direction of arrow A. Each chain 30 is thus caused to move around sprocket wheels 32, 33, 34 and 35 and in so doing moves pin 36 which, being located in cam track 40, at position 65 has first to move towards the duct axis. This movement in effect, cracks open the seal around the blocker doors edges and permits air at duct pressure to enter the aperture. This reduces but does not equalise the pressure difference across the blocker doors inner and outer sides 58 and 60 respectively. Thus operating loads on the actuating mechanism are reduced but not obviated. The blocker doors are, at this point, approximately in a position as indicated at 64 in FIG. 2 and their respective pins 36 are in a position in the cam tracks indicated at 66. When the doors are in a position 57 their respective pins are in the cam track at 68 and, as stated, it is while pins 36 are in any position between a non-operative position 65 and position 68 that duct air pressures will endeavour to return the doors to the non-operative position thus providing the desirable fail/safe feature for when the aircraft is making its landing approach.

Figure 8:
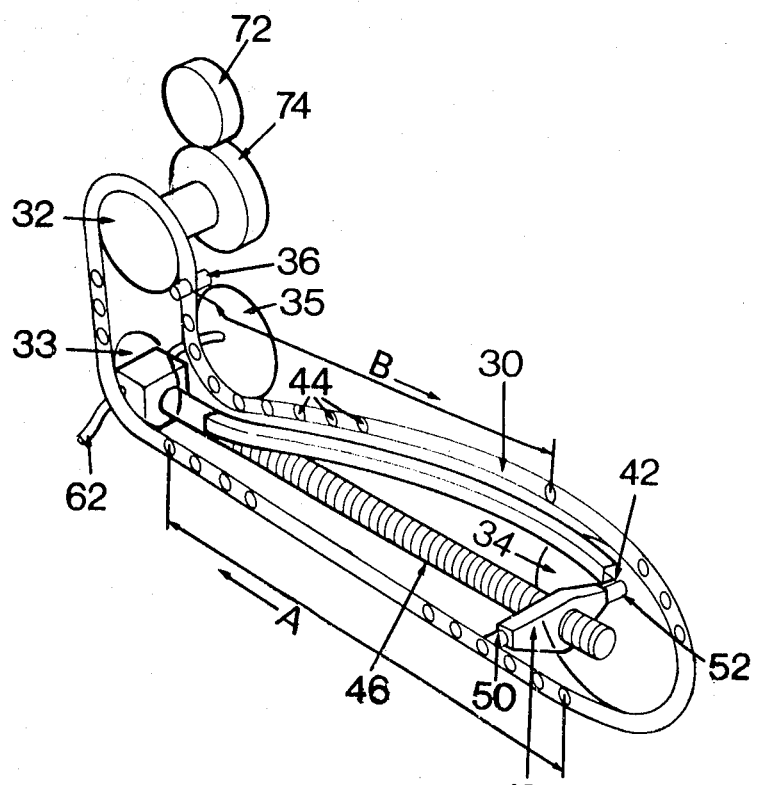
FIG. 8 is a pictorial view of a chain and its associated drive mechanism.

Arrow B in FIG. 8 clearly slows that pins 36 are forced to follow by cam tracks 40 and 42 as is also each chain 30.

As an alternative to the ball screw the chain may of course, be gear driven, gears being shown in chain dotted lines at 72 and 74. Gears 72 could be flexibly driven and transmit the drive via gears 74 to sprocket wheels 32 and thus chain 30. We claim:

1. In a gas turbine engine power plant:
   a casing defining a fluid flow duct for thrust producing fluid, said casing having an air intake at its upstream end, a propulsion nozzle at its downstream end and at least one wall with at least one aperture therein;
   thrust reverser means carried within said wall and comprising a plurality of perpherially spaced fluid flow blocker doors;
   mounting means for said blocker doors, said mounting means including links each of which is pivotally connected at one end to said casing upstream of said apertures and at the other end to a substantially mid portion of a respective one of said doors, and cam means connecting downstream ends of said doors to said casing downstream of said apertures, said cam means causing movement of the downstream end of said doors in a configurated curved path when said links are pivoted about their upstream ends to provide a first portion of travel of said blocker doors across said duct from an inoperative position blocking said apertures, said movement during said first portion of travel causing fluid pressure on said blocker doors and reaction forces on said blocker doors to cause a resultant force urging return of said blocker doors toward said inoperative position, and a second portion of travel of said doors to a fully operative position where said blocker doors block said duct, said second portion of travel cuasing a second resultant force on said doors reverse of said first-mentioned resultant force and urging movement of said doors toward blocking position; and
   moving means to selectively move said doors between said fully inoperative position to said fully operative position with at least one intermediate position partially across said duct to reverse a fraction of the thrust producing fluid, said at least one intermediate position being in said first portion of travel and having the resultant force on said blocker doors urging them to the fully inoperative position.

2. A gas turbine engine as claimed in claim 1 wherein said cam means comprises pins each having one end attached to the downstream end of respective blocker doors and passing through respective slots formed into cam tracks mounted in said casing downstream of said apertures, the other end of each said pin being fixed to said blocker door moving means.

3. A gas turbine engine as claimed in claim 2 wherein said blocker door moving means comprises a plurality of endless sprocket chains supported on sprocket wheels and driven by driving means.

4. A gas turbine engine as claimed in claim 3 wherein said moving means comprises a yoke mounted on a ball screw and having two ends, each of which is forced into a pin which locates in a respective sprocket chain, the ball screw being rotatable so that, on rotation thereof, said yoke traverses the ball screw length and causes said sprocket chain to move.

5. A gas turbine engine as claimed in claim 3 wherein each said sprocket chain has a plurality of pins which are extended lengthwise so as to locate in respective cam tracks in the fixed structure downstream of the apertures so that when said sprocket chains are driven they are forced to move in the path of their respective cam track.

6. A gas turbine engine as claimed in claim 3 wherein said moving means comprises gear chains which are drivingly connected to said sprocket wheels, driving of which in turn drives respective sprocket chains.

7. A gas turbine engine as claimed in claim 3 wherein the moving means are actuated via flexible drive couplings.

* * * * *